(12) United States Patent
Bazarsky et al.

(10) Patent No.: US 11,182,101 B2
(45) Date of Patent: Nov. 23, 2021

(54) STORAGE SYSTEM AND METHOD FOR STREAM MANAGEMENT IN A MULTI-HOST VIRTUALIZED STORAGE SYSTEM

(71) Applicant: Western Digital Technologies, Inc., San Jose, CA (US)

(72) Inventors: Alexander Bazarsky, Holon (IL); Ariel Navon, Revava (IL); Shay Benisty, Beer Sheva (IL); Judah Gamliel Hahn, Ofra (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/207,659

(22) Filed: Dec. 3, 2018

(65) Prior Publication Data

US 2020/0174695 A1 Jun. 4, 2020

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | | |
|---|---|---|---|
| 10,298,649 B2* | 5/2019 | Das | G06F 12/0246 |
| 2015/0134857 A1* | 5/2015 | Hahn | G06F 3/061 710/5 |
| 2016/0283116 A1* | 9/2016 | Ramalingam | G06F 3/0611 |
| 2017/0017411 A1* | 1/2017 | Choi | G06F 12/0246 |
| 2017/0109096 A1 | 4/2017 | Jean et al. | |
| 2017/0228157 A1 | 8/2017 | Yang et al. | |
| 2017/0315730 A1* | 11/2017 | Hashimoto | G06F 16/1847 |
| 2017/0371585 A1 | 12/2017 | Lazo et al. | |
| 2018/0024744 A1* | 1/2018 | Kim | G06F 3/0679 711/103 |
| 2018/0113642 A1* | 4/2018 | Huen | G06F 3/0605 |
| 2018/0234478 A1* | 8/2018 | Das | G06F 16/381 |
| 2018/0307598 A1* | 10/2018 | Fischer | G06F 12/0253 |
| 2018/0314421 A1 | 11/2018 | Linkovsky et al. | |
| 2019/0196969 A1* | 6/2019 | Yang | H04L 67/104 |

* cited by examiner

*Primary Examiner* — Daniel D Tsui
*Assistant Examiner* — Nicholas A. Paperno
(74) *Attorney, Agent, or Firm* — Crowell & Moring LLP

(57) ABSTRACT

A storage system and method for stream management in a multi-host virtualized storage system are provided. In one embodiment, a method for stream management is provided that is performed in a storage system in communication with a host comprising a plurality of virtual hosts. The method comprises: receiving, from the host, identification of each virtual host of the plurality of virtual hosts; analyzing usage history of each virtual host of the plurality of virtual hosts; and assigning streams to a subset of the plurality of virtual hosts based on the usage history, wherein a maximum number of streams assignable by the storage system is less than a total number of virtual hosts in the plurality of virtual hosts. Other embodiments are provided.

20 Claims, 8 Drawing Sheets

STORAGE SYSTEM AND METHOD FOR STREAM MANAGEMENT IN A MULTI-HOST VIRTUALIZED STORAGE SYSTEM

BACKGROUND

A storage system can be used with a host, and both can operate under a standard, such as the Non-Volatile Memory Express (NVMe) standard. The NVMe standard provides for a virtualization environment, in which a storage system can be used with a plurality of virtual hosts. The NVMe standard also provides a stream feature that allows a host to provide hints to the storage system to associate each write operation with a stream. Using this feature, the storage system is able to place all data associated with a stream in physically associated locations.

DETAILED DESCRIPTION

Figure 1A:
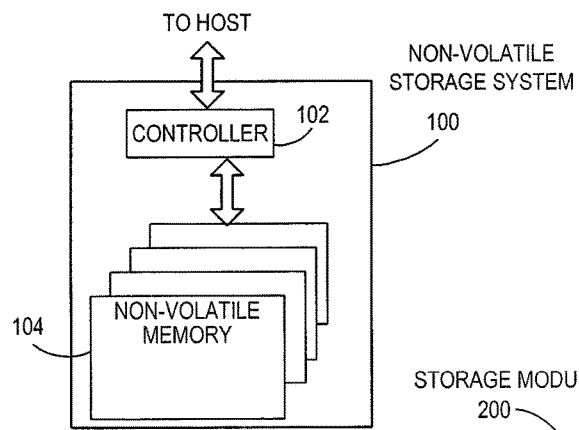
FIG. 1A is a block diagram of a non-volatile storage system of an embodiment.

By way of introduction, the below embodiments relate to a storage system and method for stream management in a multi-host virtualized storage system. In one embodiment, a method for stream management is provided that is performed in a storage system in communication with a host comprising a plurality of virtual hosts. The method comprises: receiving, from the host, identification of each virtual host of the plurality of virtual hosts; analyzing usage history of each virtual host of the plurality of virtual hosts; and assigning streams to a subset of the plurality of virtual hosts based on the usage history, wherein a maximum number of streams assignable by the storage system is less than a total number of virtual hosts in the plurality of virtual hosts.

In some embodiments, assigning streams comprises assigning multiple streams to a single virtual host.

In some embodiments, the usage history comprises one or more of the following: volume of data written, ratio of sequential versus random data written, a last timestamp, and a hit rate of a read look-ahead algorithm.

In some embodiments, the usage history is analyzed as a background operation.

In some embodiments, the usage history is analyzed in response to a total number of virtual hosts exceeding a threshold.

In some embodiments, the usage history is analyzed after an elapsed period of time.

In some embodiments, the usage history is analyzed using a machine-learning algorithm.

In some embodiments, the method further comprises assigning a stream identifier to a virtual host.

In some embodiments, the method further comprises receiving priority information for the plurality of virtual hosts, and wherein the streams are assigned at least in part based on the priority information.

In some embodiments, the storage system comprises a three-dimensional memory.

In some embodiments, the storage system is removably connectable to the host.

In some embodiments, the storage system is embedded in the host.

In another embodiment, a storage system is provided comprising a memory; and a controller configured to: receive a plurality of virtual host identifiers; analyze usage history associated with each virtual host of the plurality of the virtual host identifiers; and assign stream identifiers to a subset of the virtual host identifiers based on the usage history, wherein a maximum number of stream identifiers assignable by the storage system is less than a total number of virtual host identifiers.

In some embodiments, the usage history comprises one or more of the following: volume of data written, ratio of sequential versus random data written, a last timestamp, and a hit rate of a read look-ahead algorithm.

In some embodiments, the memory comprises a three-dimensional memory.

In another embodiment, a storage system is provided comprising: a memory; and means for assigning streams to a plurality of virtual hosts based on usage history of the plurality of virtual hosts.

In some embodiments, a maximum number of streams assignable by the storage system is less than a total number of virtual hosts in the plurality of virtual hosts.

In some embodiments, the usage history comprises one or more of the following: volume of data written, ratio of sequential versus random data written, a last timestamp, and a hit rate of a read look-ahead algorithm.

In some embodiments, the storage system further comprises means for assigning streams to the plurality of virtual hosts at least in part based on priority information.

In some embodiments, the memory comprises a three-dimensional memory.

Other embodiments are possible, and each of the embodiments can be used alone or together in combination. Accordingly, various embodiments will now be described with reference to the attached drawings.

Figure 1B:
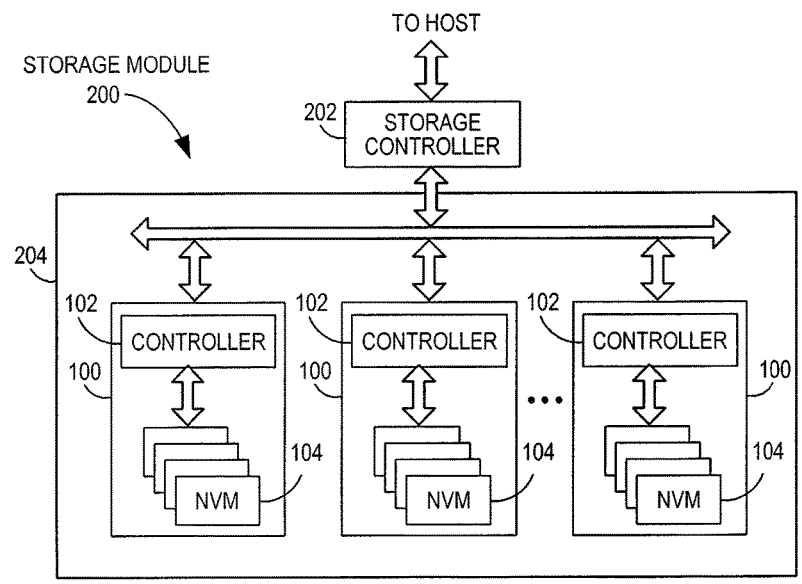
FIG. 1B is a block diagram illustrating a storage module of an embodiment.
Figure 1C:
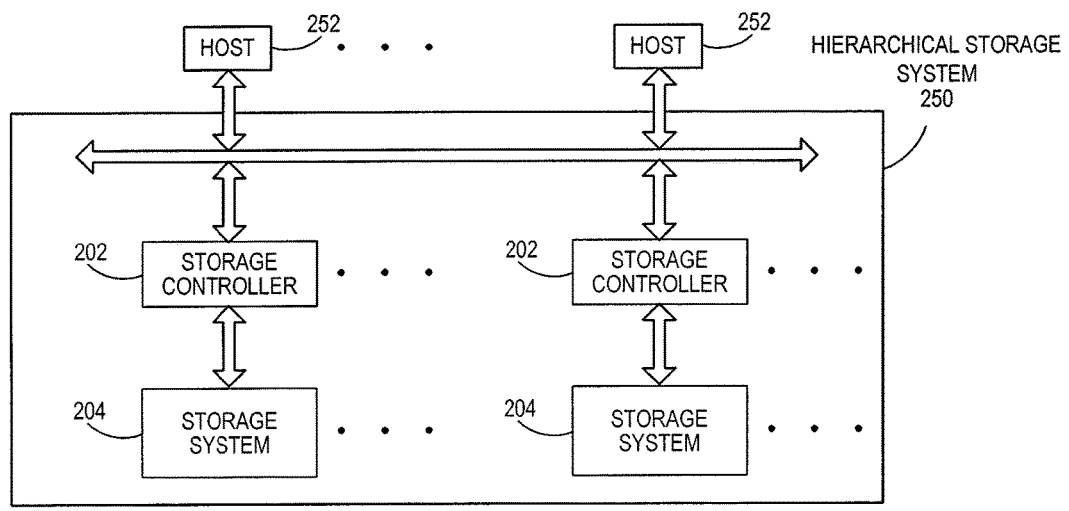
FIG. 1C is a block diagram illustrating a hierarchical storage system of an embodiment.

Turning now to the drawing, storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. (The terms "memory" and "media" may be used interchangeably herein.) Controller 102 interfaces with a host system and transmits command sequences for read, program, and erase operations to non-volatile memory die 104.

The controller 102 (which may be a flash memory controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. In operation, when a host needs to read data from or write data to the flash memory, it will communicate with the flash memory controller. If the host provides a logical address to which data is to be read/written, the flash memory controller can convert the logical address received from the host to a physical address in the flash memory. (Alternatively, the host can provide the physical address.) The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some NAND storage system architectures (such as the ones shown in FIGS. 1B and 1C), 2, 4, 8 or more NAND channels may exist between the controller and the NAND memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA) or peripheral component interconnect express (PCIe) interface. Storage module 200, in one embodiment, may be a solid state drive (SSD), such as found in portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be an NVMe or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
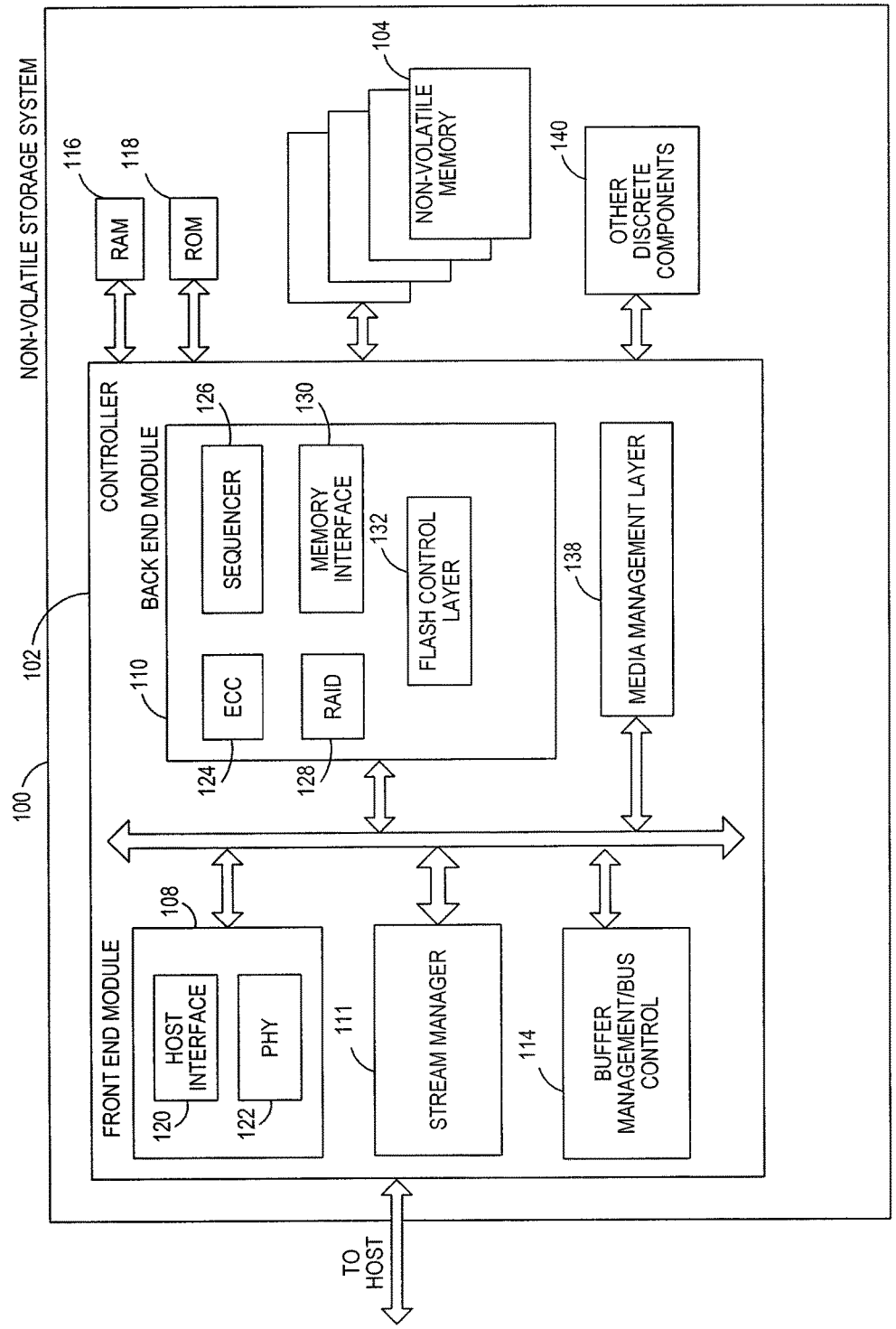
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. For example, in this embodiment, the controller 102 comprises a stream manager 111, which will be discussed in more detail below. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, SAS, Fibre Channel, USB, PCIe, and NVMe. The host interface 120 typically facilitates transfer for data, control signals, and timing signals.

Back end module 110 includes an error correction controller (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
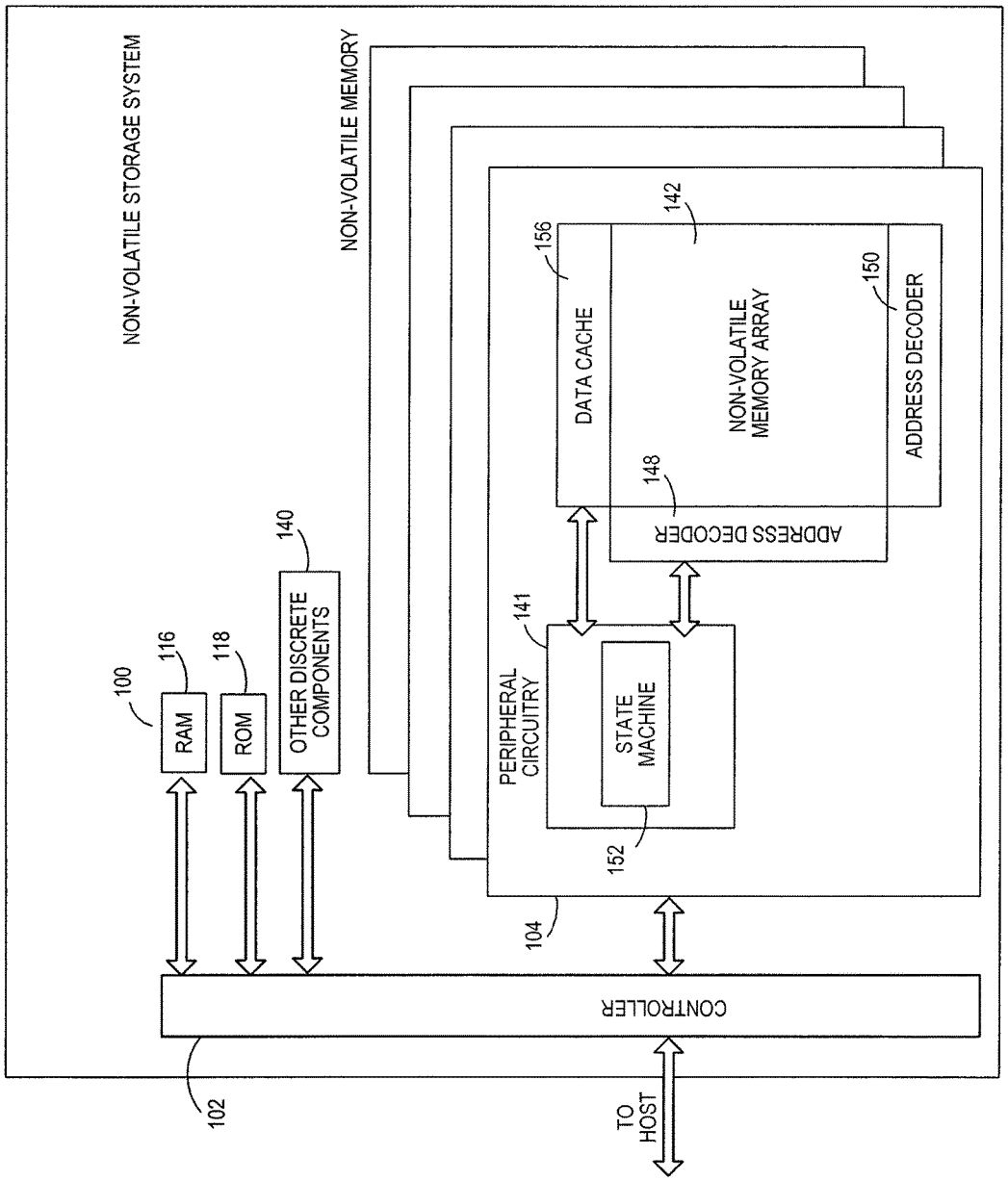
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including NAND flash memory cells and/or NOR flash memory cells in a two dimensional and/or three dimensional configuration. Non-volatile memory die 104 further includes a data cache 156 that caches data.

The storage system 100 (sometimes referred to herein as the storage media or device) can be used with a host, and both can operated under a standard or specification. One such specification is the Non-Volatile Memory Express (NVMe) specification. NVMe is a scalable host controller interface designed to address the needs of Enterprise and Client systems that utilize peripheral component interface express (PCIe)-based solid state drives. It is based on a paired submission and completion queue mechanism. Commands are placed by host software into a submission queue (SQ). Completions are placed into the associated completion queue (CQ) by the controller. Submission and completion queues are allocated either in host memory or device memory.

The latest NVMe standard (version 1.3) introduces the NVMe virtualization environment. Virtualized environments may use an NVM subsystem with multiple controllers to provide virtual or physical hosts direct I/O access. The NVM subsystem is composed of primary controller(s) and secondary controller(s), where the secondary controller(s) depend on primary controller(s) for dynamically assigned resources. A host may issue the Identify command to a primary controller specifying the Secondary Controller List to discover the secondary controllers associated with that primary controller.

The NVMe system can be referred to as a multi-user system since it usually contains many submission queues that are associated with different Host processors. This statement is relevant to any virtualized NVMe environment where multiple Hosts interact with single device. In any NVMe (non-virtualized and virtualized) environment having dozens of Host applications using different submission queues over the PCIe bus, it is desired to improve the properties of storage devices to fit the multitude of "clients," as opposed to currently serving a single "client."

Storage devices usually hold an LBA (Logical Block Address) to PBA (Physical Block Address) conversion mechanism, such that when a host asks for data from a specific LBA, the device allocates a corresponding PBA to which the data will reside. This conversion mechanism is also noted as Logical-to-Physical conversion. The management of such a conversion mechanism is not trivial, as this table constantly changes according to host operations and device current status and operations, such as garbage collection and read scrub.

In some embodiments, the host sends a stream of data to the storage system. As used herein, a "stream" represents a group of data that belong to identifiable sets of physical location and, hence, can be allocated and freed together. Each stream contains a specific pattern. So, streams enable data to be written and erased efficiently, which in turn reduces garbage collection and leads to reduced write amplification, as well as efficient flash utilization.

Recently, a demand has arisen for host virtualization in the automotive market. The progress of the accommodation of storage SSD devices with applications that require host virtualization is desired to address this advanced market. Current stream management mechanisms are well designed to serve a single host. However, when serving a multitude of clients (hosts), these mechanisms may be suboptimal and may lead to delayed (sequential or random) read latencies and impaired throughput. The embodiments below can be used to incorporate an innovative concept that adapts the stream management of a storage device to a multi-host or virtualized storage system, which improve stream management in a storage device that serves multiple clients.

Figure 3:
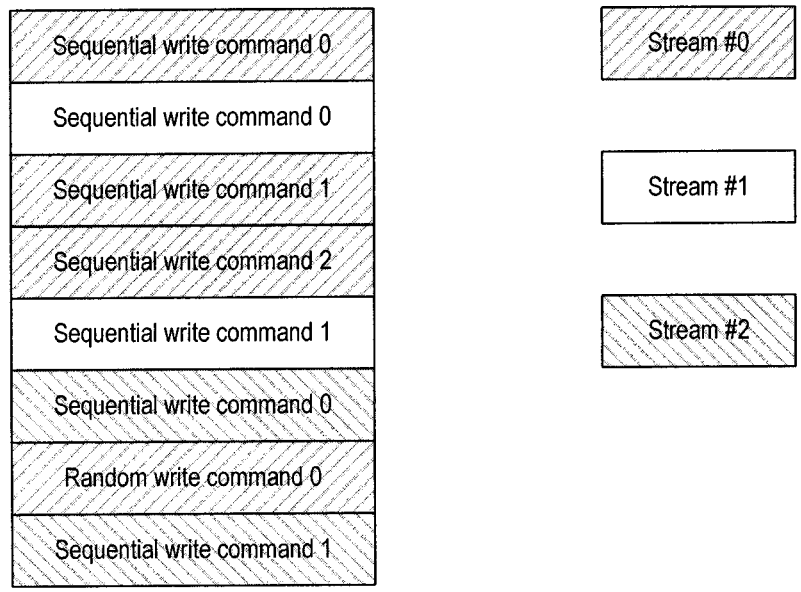
FIG. 3 is an illustration of a queue of an embodiment composed of commands from several streams.

Turning again to the drawings, FIG. 3 is an illustration of a queue of an embodiment composed of commands from several streams. In this example, the commands are interleaved between the streams, as each of the streams is agnostic to the other streams. Streams allow separating the data coming from different sources so that the flash translation layer (FTL) is aware of several sources writing data independently and concurrently and can separate the data, so that when a single source is later reading data sequentially, the data is stored in sequential manner.

However, the number of streams held inside a device is limited, as this number stems from the available resources, such as RAM and table sizes. The typical stream number is around 16-32, which may be considerably less than the number of virtual hosts in the system, which may reach up to 128 in current systems. In the future, this number is expected to rise, and adding more internal streams may cost additional resources. In such a scenario, it is not possible to assign a stream per virtual host without impairing the overall performance.

Virtual hosts' behavior can be individual. One virtual host may write only sequential data, while another virtual host may write only random data. If an expensive stream identifier (ID) is assigned to each of the virtual hosts (and some virtual hosts are left out due to lack of stream IDs), the virtual hosts that present random behavior will impair the overall performance of the system as the stream ID will be "wasted" on them.

The impact of this problem may be as significant as improving random read performance to sequential read performance is desired for certain use cases. If data in the example shown in FIG. 3 is written completely interleaved (and there is no stream ID assigned to this sequential data), read performance of such data may be reduced to random read performance, when each of the virtual hosts will attempt to read its seemingly sequential data. For some storage systems, this performance gap may be at least twice for the sequential read performance, which is very significant.

Figures 4A, 4B:
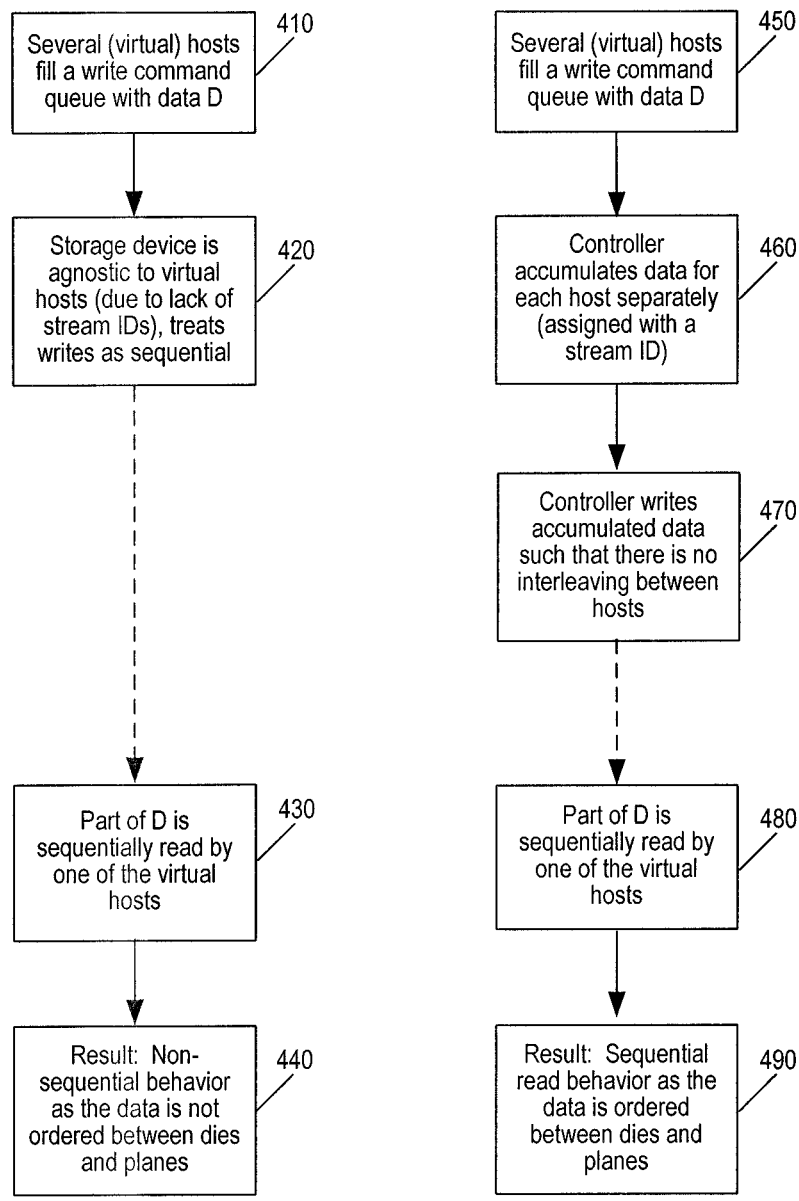
FIG. 4A is a flow chart of a method of an embodiment without stream detection.
FIG. 4B is a flow chart of a method of an embodiment with stream detection.

FIG. 4A is a flow chart of a method of an embodiment without stream detection and shows this problematic flow. As shown in FIG. 4A, several (virtual) hosts fill a write command queue with data D (act 410). The storage device 100 is agnostic to virtual hosts (due to the lack of stream IDs) and treats the writes a sequential (act 420). As such, data is written across all memory blocks without distinction to the virtual host. However, on the read path (the dotted connector represents moving to the read path) when data is read by one of the virtual hosts, it is not ordered sequentially, thus resulting in impaired performance. More specifically, part of the data D is then sequentially read by one of the virtual hosts (act 430), and the result is non-sequential behavior as the data is not ordered between dies and planes (act 440).

In contrast, FIG. 4B is a flow chart of a method of an embodiment with stream detection. As shown in FIG. 4B, several (virtual) hosts fill a write command queue with data D (act 450). The controller of the storage system 100 accumulates data for each host separately (assigned with a stream ID) (act 460). The controller then writes the accumulated data such that there is no interleaving between streams (act 470). During a read operation, part of data D is sequentially read by one of the virtual hosts (act 480). The result is sequential read behavior as the data is ordered between dies and planes (act 490).

Figure 5:
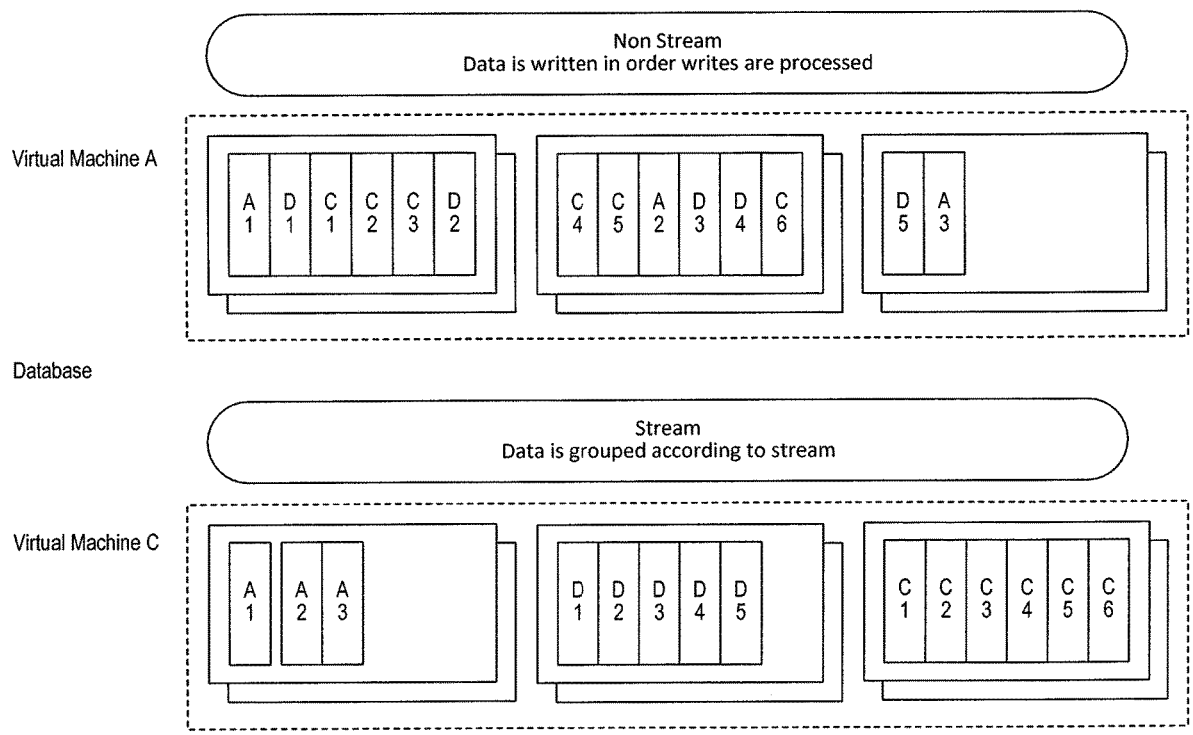
FIG. 5 is an illustration of non-volatile memory express (NVMe) streams of an embodiment.

As mentioned above, NVMe is a specification that can be used by storage systems and hosts. NVMe 1.3 introduces a new feature named NVMe stream. This feature allows a Host to associate each write operation with a stream. Using this feature, the storage device 100 is able to place all data associated with a stream in physically associated locations. The concept is illustrated in FIG. 5. Using Host hints in each write command, write commands are classified, accumulated separately, and written to the media (memory) in an optimal way.

There are several drawbacks to this approach. First, the NVMe stream feature relies on Host hints, which may not really help FTL management due to specific implementation or "wrong" hits. Second, if the host application does not support this feature, modifying the host application to support this feature can add overhead to the host. Therefore, this feature may not be supported by all applications. Third, the NVMe stream is relevant for write commands only and not to other I/O commands. As will be explained in more detail below, some of the embodiments presented herein do not rely on any Host hints for the streaming mechanism, thereby overcoming these issues.

The following embodiments provide a designated storage stream allocation scheme that is adaptively optimized to serve a multitude of host platforms. These embodiments can be applied to any multi-host environment—including virtualization in SSDs. Several embodiments are disclosed and detailed below. Among the many benefits of these embodiments are improvement of read latency and throughput, as well as QoS (Quality of Service) compatibility in both sequential and random read operation modes. Furthermore, these embodiments can be used to increase the hit rate of a read look ahead mechanism since the algorithm is optimized to a multi-host environment. One example of a read look ahead mechanism is provided in U.S. patent application Ser. No. 15/497,547, which is hereby incorporated by reference.

In general, these embodiments relate to the internal stream allocation itself (i.e., optimizing the stream allocation per host decision procedure) and the assignment of the overall management storage space between the different virtual hosts. In one implementation, this embodiment has two parts. First, the storage system identifies virtual hosts as streams on top of other well-known parameters, such as namespace, LBA and size (may be done implicitly, using virtual host ID). Second, the storage system treats the virtual hosts accordingly, based on stream-type concepts.

Figure 6:
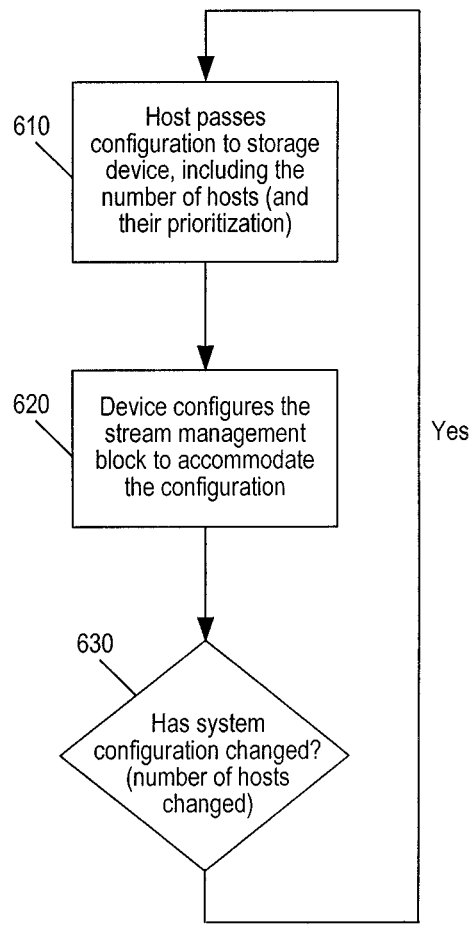
FIG. 6 is a flow chart of a method of an embodiment for stream management in a multi-host virtualized storage system.

FIG. 6 is a flow chart of a method of an embodiment for stream management in a multi-host virtualized storage system. As shown in FIG. 6, the host passes configuration information to the storage device 100, including the number of hosts and the prioritization (act 610). The device 100 then configures the stream management block 111 to accommodate the configuration (act 620). The storage device 100 then determines if the system configuration is changed, such as if the number of hosts has changed (act 630). As seen by this example, the system may include an indication from the protocol to the number of the (virtualized) hosts that the device serves, and a prioritization between the hosts may also be supplied to the storage device 100. The device 100 may then respond by configuring the stream management method according to the number of virtualized hosts and the prioritization between the hosts, if such is supplied by the host. It should be noted that some aspects of these embodiments may also apply to a multi-queue system with queues that are distinguished from one another, rather than a multi-host system.

In one embodiment, the history of each of the host IDs that are writing to the device and reading from the device is considered. Using this history and given that the number of hosts (HostNum) is greater than the number of available streams (StreamNum) that are assigned to hosts, it can consider which are the top StreamNum hosts that "deserve" a stream ID. In some other embodiments, several streams might be used for a specific Host while other Hosts will not get any candidate streams. This may happen when the storage device 100 detects that it is better to do so from performance and endurance aspect.

In one embodiment, a score is developed for each host ID based on the volume of data that it is writing, the ratio of sequential vs random data that it is writing, the last timestamp of each of the host IDs, and the hit rate results of the read look-ahead algorithm. Using this score, the system 100 can choose the top StreamNum hosts and assign a Stream ID to each of these. This process may occur during the background operation of the device 100 or according to certain triggers, such as the number of virtual hosts increasing beyond some threshold or the overall performance dropping below some threshold. These embodiments can improve the overall performance as they will assign valuable stream IDs to the host IDs that show the behavior that streams are taking advantage of.

Figure 7:
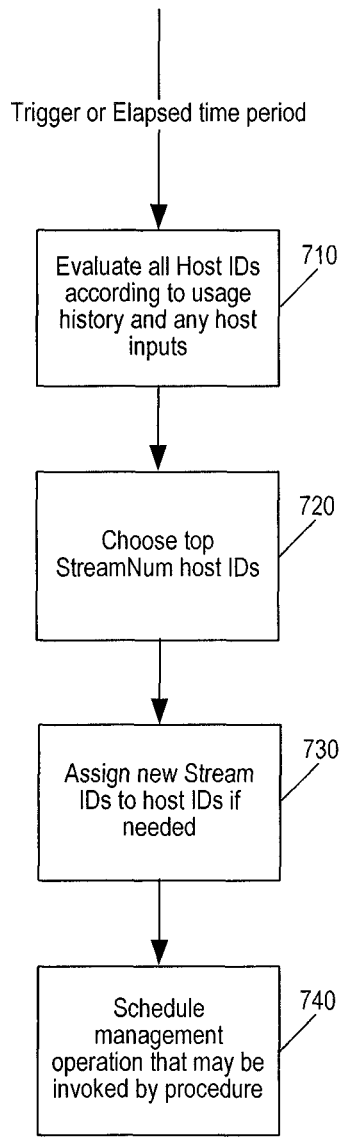
FIG. 7 is a flow chart of a method of an embodiment for host rebalancing.

FIG. 7 is a flow chart of a method of an embodiment for host rebalancing. As shown in FIG. 7, after a trigger or an elapsed time period, the storage system 100 evaluates all host IDs according to usage history and any host inputs (act 710). For example, the storage system 100 can evaluate the volume of data that is being written, the ratio of sequential vs random data that is being written, and the last timestamp of each of the host IDs and develop scores for all Host IDs. Host IDs that are not used for a long period of time can be dropped. The storage system 100 can use simple selection criteria, which can vary with StreamNum but stay rather hard-coded to allow for a simple implementation. However, it may also implement a more elaborate system learning the state of each of the hosts with a time-based machine learning approach, such as reinforcement learning. Then, conclusions can be derived according to the future projection of host actions.

Next, the storage system 100 chooses the top StreamNum host IDs (act 720). The storage system 100 then assigns new stream IDs to host IDs, if needed (act 730). In this way, after the top StreamNum Host IDs are selected, any modifications to the current stream list can be assigned with Stream ID. Host IDs that stay with a stream may not change its index. Finally, the storage system 100 schedules a management operation that may be invoked by the procedure (act 740). In this act, since the system has reassigned some of the stream resources, some management operations may be scheduled to account for this procedure. As further modifications (and reversal of this process) may occur, these management operations may be of low priority.

There are several advantages associated with these embodiments. For example, these embodiments can be used to overcome the drawbacks of the NVMe stream feature discussed above that relies on Host hints, which may not really help FTL management due to specific implementation or "wrong" hits. Further, the host application may not support this feature, and supporting this feature can add overhead to the host, which may result in this feature not being supported by all applications. Additionally, NVMe stream is relevant for write commands only and not to other I/O commands. In one embodiment, when the NVMe stream feature is enabled and activated, the storage device 100 starts working and managing the media based on host hints. In parallel, the storage device 100 makes sure that the host really works based on those hints and provides better performance and endurance. If not, the storage device 100 can disregard those hints and start managing the FTL, as discussed above. This can result in improved throughput and quality of service (QoS) in multi-host and virtual host environments. The improvement may be drastic, as, in some cases, storage systems serving multiple hosts may behave like a random read scenario related to a sequential read scenario. Accordingly, these embodiments may improve user experience significantly. Furthermore, these embodiments can increase the hit rate of the read look ahead mechanism implemented in the storage system since the internal stream detection algorithm can be optimized to a multi-host environment.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A method for stream management, the method comprising:
performing the following in a storage system in communication with a host comprising a plurality of virtual hosts:
receiving, from the host, identification of each virtual host of the plurality of virtual hosts;
analyzing hit rates of read look-ahead algorithms used for each virtual host of the plurality of virtual hosts;
assigning streams to a subset of the plurality of virtual hosts based on the hit rates, wherein:
a maximum number of streams assignable by the storage system is less than a total number of virtual hosts in the plurality of virtual hosts;
a remainder of the subset of the plurality of virtual hosts are not assigned a stream; and
by not being assigned a stream, the remainder of the subset of the plurality of virtual hosts do not have access to a memory of the storage system;
separately accumulating data from each of the subset of the plurality of virtual hosts; and
writing the separately-accumulated data from each of the subset of the plurality of virtual hosts into a submission queue such that there is no interleaving of data between different virtual hosts of the subset of the plurality of virtual hosts;
wherein assigning streams based on the hit rates increases the hit rates of the read look-ahead algorithms.

2. The method of claim 1, wherein assigning streams comprises assigning multiple streams to a single virtual host.

3. The method of claim 1, wherein the hit rates are analyzed as a background operation.

4. The method of claim 1, wherein the hit rates are analyzed in response to the total number of virtual hosts exceeding a threshold.

5. The method of claim 1, wherein the hit rates are analyzed after an elapsed period of time.

6. The method of claim 1, wherein the hit rates are analyzed using a machine-learning algorithm.

7. The method of claim 1, further comprising assigning a stream identifier to a virtual host.

8. The method of claim 1, further comprising receiving priority information for the plurality of virtual hosts, and wherein the streams are assigned at least in part based on the priority information.

9. The method of claim 1, wherein the memory comprises a three-dimensional memory.

10. The method of claim 1, wherein the storage system is removably connectable to the host.

11. The method of claim 1, wherein the storage system is embedded in the host.

12. A storage system comprising:
a memory; and
a controller configured to:
receive a plurality of virtual host identifiers;
analyze hit rates of read look-ahead algorithms associated with each virtual host identifier of the plurality of the virtual host identifiers;
assign stream identifiers to a subset of the plurality of virtual host identifiers based on the hit rates, wherein:
a maximum number of stream identifiers assignable by the storage system is less than a total number of virtual host identifiers in the plurality of virtual host identifiers;
a remainder of the subset of the plurality of virtual host identifiers are not assigned a stream identifier; and
by not being assigned a stream identifier, virtual hosts associated with the remainder of the subset of the plurality of virtual host identifiers do not have access to the memory of the storage system;

separately accumulate data from each of virtual host associated with the subset of the plurality of virtual host identifiers; and write the separately-accumulated data from each virtual host associated with the subset of the plurality of virtual host identifiers into a submission queue such that there is no interleaving of data between different virtual hosts;

wherein assigning stream identifiers based on the hit rates increases the hit rates of the read look-ahead algorithms.

13. The storage system of claim 12, wherein the memory comprises a three-dimensional memory.

14. A storage system comprising:

a memory;

means for assigning streams to a subset of a plurality of virtual hosts based on hit rates of read look-ahead algorithms used for each of the plurality of virtual hosts, wherein:

a maximum number of streams assignable by the storage system is less than a total number of virtual hosts in the plurality of virtual hosts;

a remainder of the subset of the plurality of virtual hosts are not assigned a stream; and by not being assigned a stream, the remainder of the subset of the plurality of virtual hosts do not have access to the memory of the storage system;

means for separately accumulating data from each of the subset of the plurality of virtual hosts; and means for writing the separately-accumulated data from each of the subset of the plurality of virtual hosts into a submission queue such that there is no interleaving of data between different virtual hosts of the subset of the plurality of virtual hosts;

wherein assigning streams based on the hit rates increases the hit rates of the read look-ahead algorithms.

15. The method of claim 1, further comprising analyzing usage history of each virtual host of the plurality of virtual hosts.

16. The storage system of claim 12, wherein the controller is further configured to analyze usage history of each virtual host of the plurality of virtual hosts.

17. The storage system of claim 12, wherein the controller is further configured to analyze the hit rates as a background operation.

18. The storage system of claim 12, wherein the controller is further configured to analyze the hit rates in response to the total number of virtual host identifiers exceeding a threshold.

19. The storage system of claim 12, wherein the controller is further configured to analyze the hit rates after an elapsed period of time.

20. The storage system of claim 12, wherein the controller is further configured to analyze the hit rates using a machine-learning algorithm.

* * * * *